United States Patent
Franck

(10) Patent No.: US 7,281,470 B2
(45) Date of Patent: Oct. 16, 2007

(54) APPARATUS FOR CONTINUOUSLY PASTEURIZING MEAT AND FOOD PRODUCTS

(76) Inventor: Adam Franck, Via Cavour, 3, 20048 Carate Brianza (IT)

( * ) Notice: Subject to any disclaimer, the term of this patent is extended or adjusted under 35 U.S.C. 154(b) by 696 days.

(21) Appl. No.: 10/491,159

(22) PCT Filed: Apr. 9, 2002

(86) PCT No.: PCT/IT02/00224

§ 371 (c)(1),
(2), (4) Date: Mar. 29, 2004

(87) PCT Pub. No.: WO03/032757

PCT Pub. Date: Apr. 24, 2003

(65) Prior Publication Data

US 2004/0237800 A1    Dec. 2, 2004

(30) Foreign Application Priority Data

Oct. 17, 2001 (IT) .......................... M12001A2159

(51) Int. Cl.
*A23L 1/00* (2006.01)
(52) U.S. Cl. ........................................ 99/483; 99/362
(58) Field of Classification Search ................ 99/339, 99/340, 352–355, 359–371, 467, 470, 477–480, 99/443 R, 443 C; 198/470.1, 704, 803.3; 134/73, 75, 34, 108; 422/25, 105, 114
See application file for complete search history.

(56) References Cited

U.S. PATENT DOCUMENTS

| | | | |
|---|---|---|---|
| 2,010,667 A | | 8/1935 | Herold et al. |
| 2,333,544 A | | 11/1943 | Meyer |
| 3,693,953 A | * | 9/1972 | Michel .......................... 432/11 |
| 3,850,089 A | * | 11/1974 | Johnson et al. ................ 99/483 |
| 3,868,897 A | | 3/1975 | Moreau |
| 4,117,921 A | * | 10/1978 | Mikata ..................... 198/470.1 |
| 4,263,254 A | * | 4/1981 | Huling ......................... 422/25 |
| 4,279,858 A | * | 7/1981 | Huling ......................... 422/25 |
| 4,331,629 A | * | 5/1982 | Huling ......................... 422/25 |
| 4,490,401 A | | 12/1984 | Becker et al. |
| 4,796,523 A | * | 1/1989 | Mette .......................... 99/470 |
| 5,179,890 A | * | 1/1993 | Reuveni et al. ............... 99/362 |

FOREIGN PATENT DOCUMENTS

| | | |
|---|---|---|
| EP | 0 760 214 | 3/1997 |
| WO | WO96/02626 | 2/1996 |

\* cited by examiner

*Primary Examiner*—Timothy F. Simone
(74) *Attorney, Agent, or Firm*—Hedman & Costigan PC; James V. Costigan

(57) ABSTRACT

Apparatus for continuously pasteurizing meat and food products, characterized in that said apparatus comprises: a supporting framework supporting a top basin and bottom basin, both substantially longitudinally horizontally extending, and arranged one above the other, the top basin being supplied with hot water and the bottom basin being supplied with cold water; feeding means for feeding the products through the top basin; transfer means for transferring the products from the top basin to the bottom basin; means for varying the product holding time in the top basin; further feeding means for feeding the products through the bottom basin and withdrawing means for withdrawing the products from the bottom basin; and means for changing the product holding time, in a selective manner, at least in the bottom basin.

15 Claims, 6 Drawing Sheets

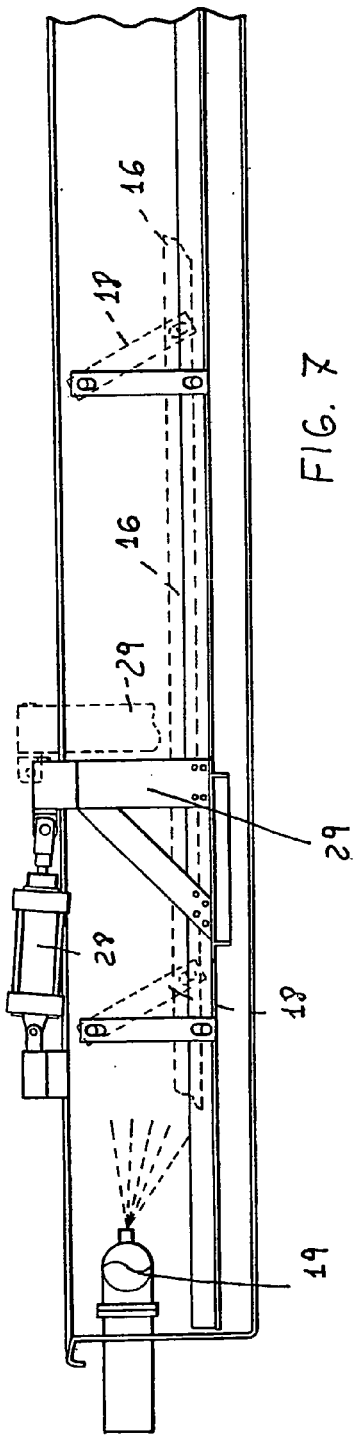
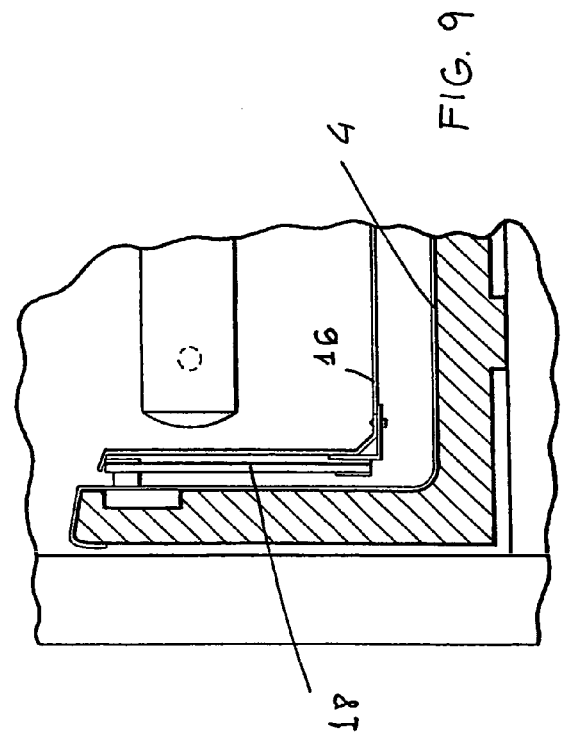
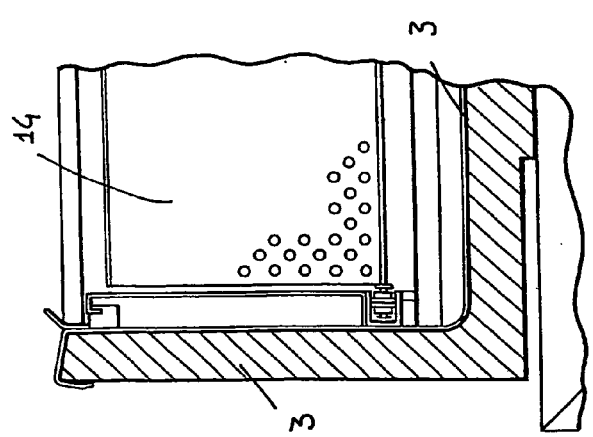

APPARATUS FOR CONTINUOUSLY PASTEURIZING MEAT AND FOOD PRODUCTS

BACKGROUND OF THE INVENTION

The present invention relates to an apparatus for deeply continuously pasteurizing meat and food products, packaged with a variable holding time, which apparatus can be used, for example, for pasteurizing sausage products, such as würstels (mortadellas), cooked jam portions, "raviolis" or "tortellinis" in trays and so on.

As is known, in pasteurizing food products, in particular meat products, the holding time during which these products are held at the pasteurizing temperature, and the cooling time, after the heating of the products, are basilar parameters.

Moreover, as it is desired to carry out a depth pasteurizing, i.e. a pasteurizing also extending to the inside of the food product to be processed, it is necessary to use, at present, large size pasteurizing systems.

In the latter, product cooling basins must have a great length, as conveyor belts driven with a constant speed are used.

In the above mentioned applications, the cooling basins must have a length of two-four times the length of the provided heating basins, to provide a depth pasteurizing, also involving the inside of the middle and large size meat products.

If the above mentioned parameters are not perfectly controlled, then it is not possible to provide satisfactory results in preserving the food products processed by the above mentioned technique.

SUMMARY OF THE INVENTION

Accordingly, the aim of the present invention is to provide such an apparatus for pasteurizing food products, allowing to change and control, with a great precision, both the holding time in which the food products are held at the pasteurizing temperature, and the following cooling time of the pasteurized products.

Within the scope of the above mentioned aim, a main object of the present invention is to provide such an apparatus which allows to carry out a depth pasteurizing, and which has a small size construction.

Another object of the present invention is to provide such an apparatus which is adapted to simultaneously process sever types of products, so as to suitably separate product batches in several sectors of the cooling basin.

Yet another object of the present invention is to provide such an apparatus which is very reliable and safe in operation.

According to one aspect of the present invention, the above mentioned aim and objects, as well as yet other objects, which will become more apparent hereinafter, are achieved by an apparatus for continuously pasteurizing food products, characterized in that said apparatus comprises: a supporting framework supporting a top basin and a bottom basin, both said top and bottom basins substantially longitudinally horizontally extending and being arranged one above the other, said top basin being supplied with hot water and said bottom basin being supplied with cold water; feeding means for feeding the products through the top basin; transfer means for transferring the products from the top basin to the bottom basin; product holding time changing means for changing the product holding time in the top basin; further feeding means for feeding the products through the bottom basin and product withdrawing means for withdrawing the products from the bottom basin; and further holding time changing means for changing the product holding means, in a selective manner, at least in the bottom basin.

BRIEF DESCRIPTION OF THE DRAWINGS

Further characteristics and advantages of the present invention will become more apparent hereinafter from the following detailed disclosure of a preferred, though not exclusive, embodiment of the invention which is illustrated, by way of an indicative, but not limitative example, in the accompanying drawings, where:

FIG. 7 is a further side elevation partial view of the cooling section of the apparatus;

FIG. 8 is a partial, cross-sectional view, illustrating a side portion of a track arrangement of the pasteurizing section; and FIG. 9 is a further partial cross-sectional view illustrating a side portion of a track arrangement of the cooling section of the pasteurizing apparatus.

DESCRIPTION OF THE PREFERRED EMBODIMENTS

Figure 1A:
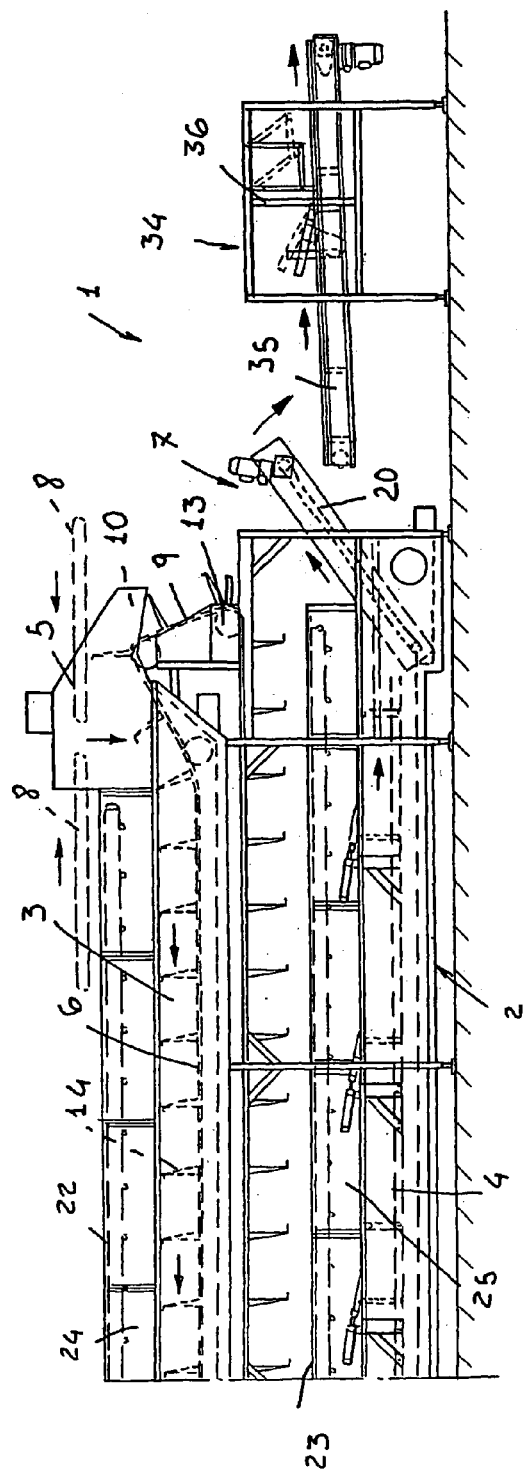
FIG. 1A is a broken-away and side elevation view illustrating one end of the overall apparatus for pasteurizing food products according to the present invention and FIG. 1B is a broken-away and side elevation view illustrating opposite end of the overall apparatus for pasteurizing food products according to the present invention that is shown in FIG. 1A.

With reference to the number references of the above mentioned figures, the pasteurizing apparatus for pasteurizing, also in a depth manner, food products, and in particular meat products, according to the invention, which has been generally indicated by the reference number 1, comprises a supporting framework 2, which can be made, for example, of metal components, and supporting a top basin 3 and a bottom basin 4, which substantially longitudinally horizontally extend, and being arranged one above the other so as to substantially reduce the overall size of the pasteurizing apparatus.

The top basin 3 is supplied with hot water at a temperature suitable for pasteurizing the product fed into said top basin 3.

To that end, the top basin 3 comprises top manifolds 32, designed for spraying hot water on the food product being fed on the conveyor 9, which will be disclosed in a more detailed manner hereinafter.

The bottom basin 4, in turn, is supplied with cold water, at a temperature which can vary from 0.5° C. to 10° C., thereby cooling the pasteurized products.

The bottom basin 4 comprises moreover, as shown, a plurality of top manifolds 33 designed for spraying cold water on the product being fed through the bottom basin 4, as it will be disclosed in a more detailed manner hereinafter.

The pasteurizing apparatus according to the invention comprises moreover feeding means 5 for feeding the food products to be pasteurized into the top basin 3, further feeding means 6 for feeding the products through the top basin 3 and for transferring said products from the top basin 3 to the bottom basin 4, and yet further feeding means for feeding the products through the bottom basin 4, as well as withdrawing means 7 for withdrawing the products from the bottom basin 4.

More specifically, the means 5 for feeding the products into the top basin 3 comprise a conveyor belt 8, or a plurality of conveyor belts, in this case two conveyor belts.

Figure 1B:
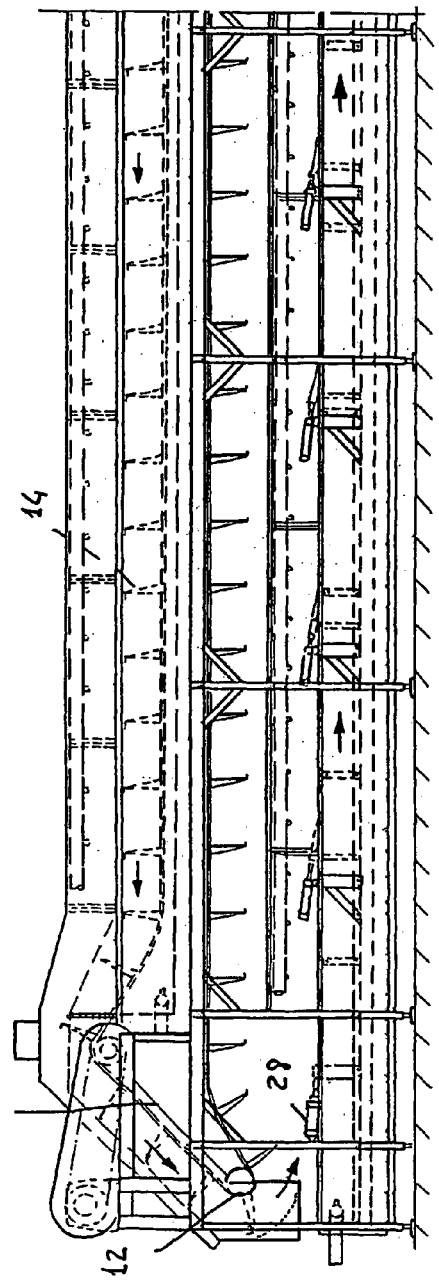
Figure 2:
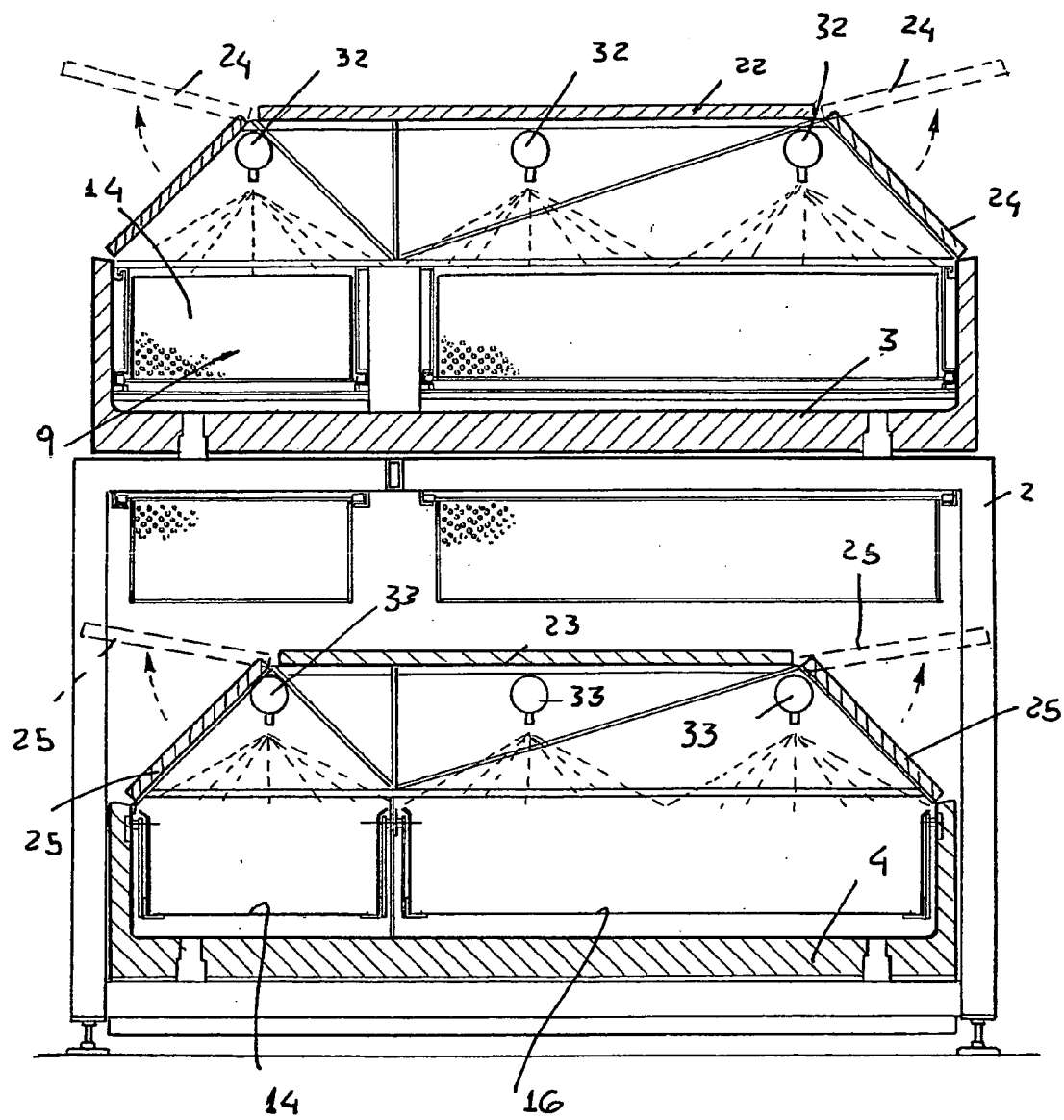
FIG. 2 is a cross-sectional view of the pasteurizing apparatus according to the invention.
Figure 3:
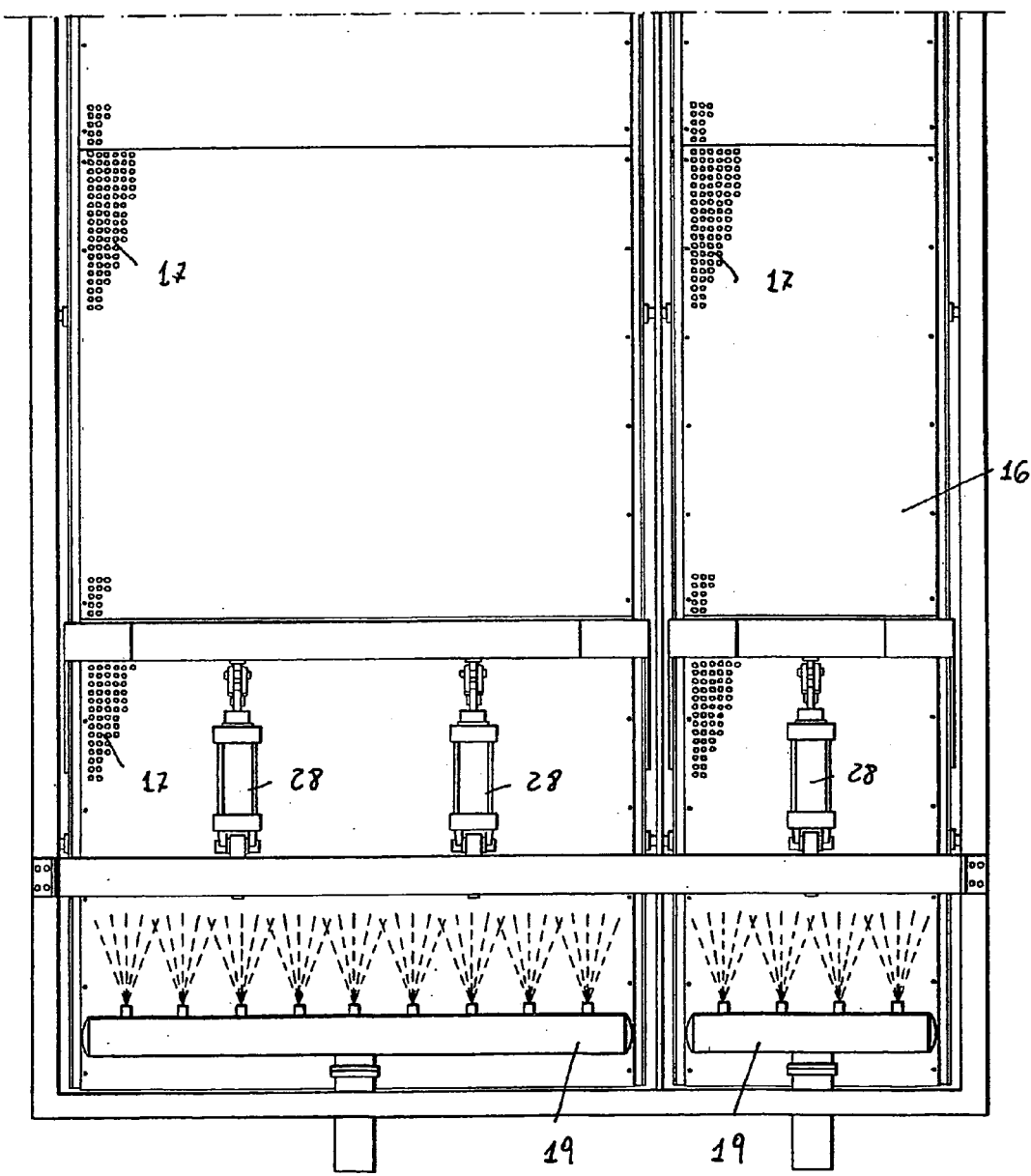
FIG. 3 is an enlarged top plan partial view of the bottom basin of the pasteurizing apparatus according to the invention.
Figure 4:
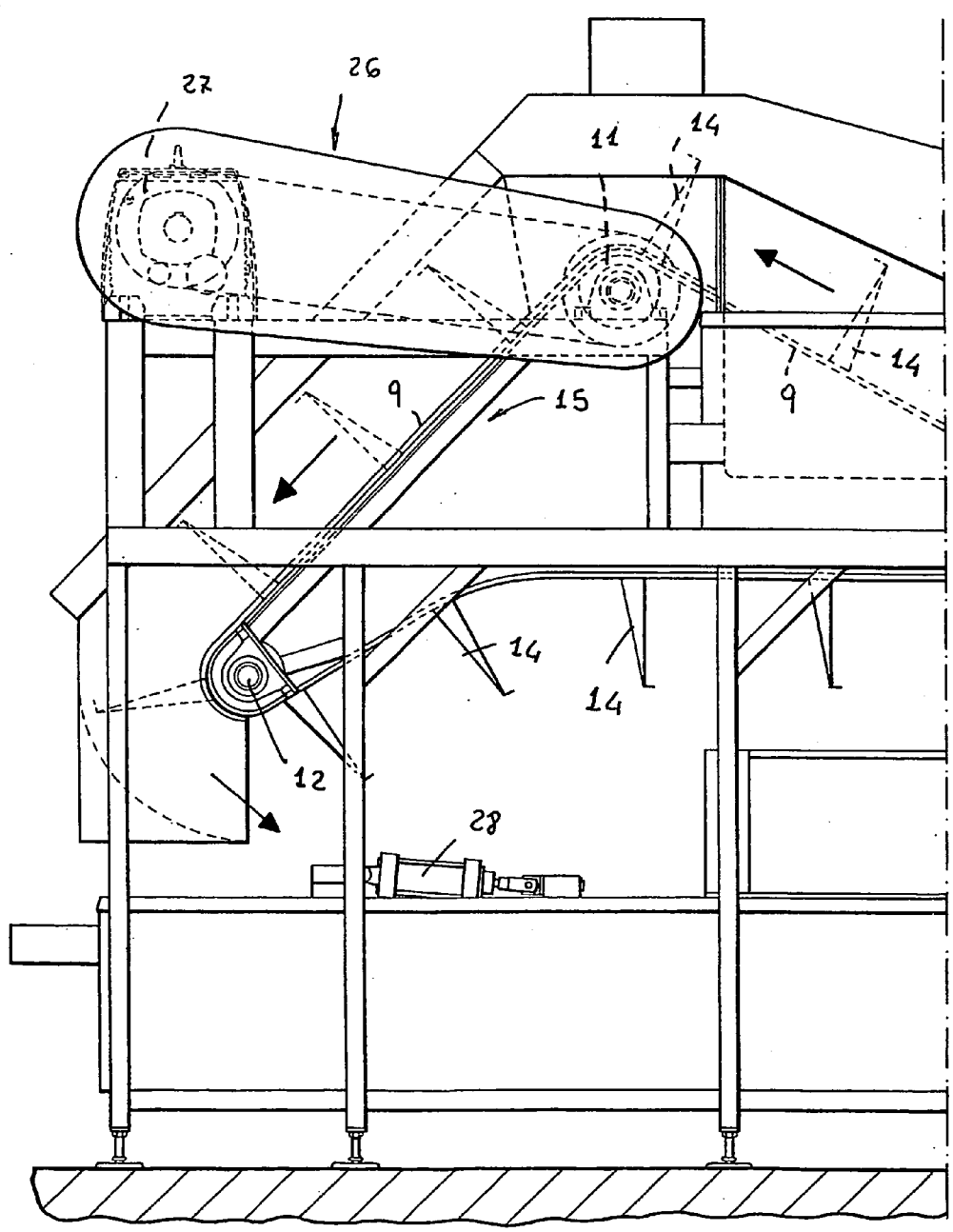
FIG. 4 is a side elevation view illustrating, in details, the product transfer region for transferring the food product from the top basin to the bottom basin.
Figure 5:
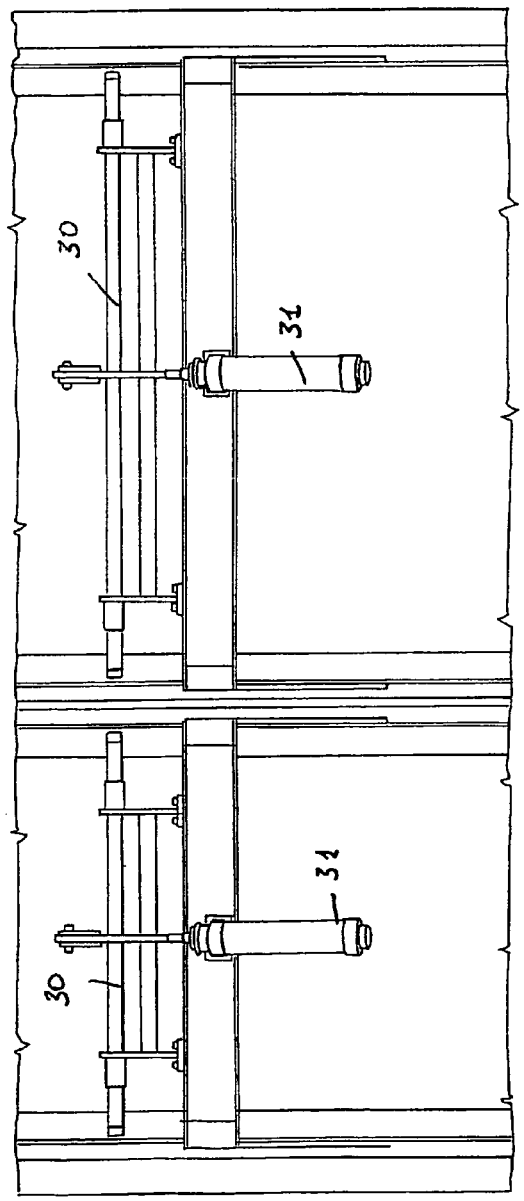
FIG. 5 is a partial top plan view illustrating, in details, the gate elements for separating different product batches.
Figure 6:
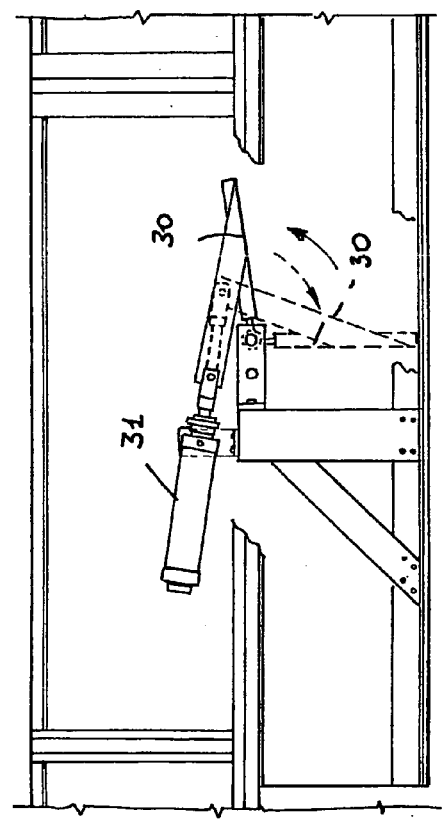
FIG. 6 is a partial side elevation cross-sectional view illustrating a detail of a gate element for changing the product batches to be pasteurized and cooled.

Said conveyor belts have their outlets arranged at a longitudinal end portion of the top basin 3, located on the right side, in the pasteurizing arrangement shown in FIG. 1.

The feeding means 6 for feeding the food products through the top basin 3 comprise a conveyor, for example a chain conveyor 9, including a plurality of chains entrained on pinions 10, 11, 12 and 13, having horizontal axes, which are supported by the supporting framework 2 and which, at least in part are driven so as to entrain the conveyor along the longitudinal extension of the top basin 3.

The driving of the conveyor is provided by a chain transmission 26, coupling the shaft of the pinion 11 to a driving motor 27.

The conveyor 9 comprises, along its extension, separating walls 14, which are spaced from one another and engage with the products to be pasteurized supplied into the top basin 3, for feeding said products along the longitudinal extension of said top basin 3.

The conveyor 9 extends from a longitudinal end portion to the other longitudinal end portion of the top basin 3.

At the longitudinal end portion of the top basin 3 opposite to the longitudinal end portion thereof served by the conveyor belt 8, the latter extends with a inclined portion 15, by means of which the food products are transferred from the top basin 3 to the bottom basin 4.

The return branch of the conveyor 9 extends between the top basin 3 and bottom basin 4.

The feeding means for feeding the food products through the bottom basin 4 comprise panels 16, which are traversed by a plurality of elongated slots or holes 17.

Said panels are arranged parallel to the bottom of the bottom basin 4 and are supported by supporting arms 18, which can be controllably swingably driven about horizontal axes, thereby displacing said panels 16 from the bottom of the bottom basin 4 upward and with a component parallel to the longitudinal extension of the bottom basin 4.

Thus, the products arranged in the bottom basin 4 are caused to be fed, with different and adjustable speeds, from the longitudinal end portion of said basin, arranged at the passage region of the products from the top basin 3 to the bottom basin 4, in the direction of the opposite longitudinal end portion thereof.

The swinging movement of said panels 16 is obtained by swinging pistons 28 each of which has an end portion thereof coupled to the body of the bottom basin 4 and the other end portion coupled to a bracket element 29 rigid with said panels 16.

Advantageously, the panels 16 of the bottom basin 4, i.e. the cooling basin, can be divided into sectors, for separating different food product batches or lots.

This separation can be performed by a plurality of movable gate elements or walls, each indicated by the reference number 30 and driven by a respective pneumatic piston 31, thereby allowing said movable gate elements to be raised in order to allow a selected product batch to be passed therethrough, and lowered, in order to restrain another product batch or lot, so as to prevent the latter from being fed, and, vice versa, allowing the feeding of the product batches not locked by the gate elements.

By suitably driving the separating walls or gate elements 30, it is accordingly possible to choose or sort the product batches to be fed or to be put in a standby condition, according to the cooling degree provided for each batch or lot.

The feeding means for feeding the products through the bottom basin 4 also comprises a plurality of nozzles 19 which are supplied with pressurized water.

Said nozzles 19 are so oriented as to cause the products arranged in the bottom basin 4 and affected by the jets provided by said nozzles 19 to be fed toward the longitudinal end portion of the bottom basin 4, arranged on the opposite portion, with respect to the passage region of the products from the top basin 3 to the bottom basin 4.

The withdrawing means 7, for withdrawing the food products from the bottom basin 4 comprise a conveyor belt 20, designed for receiving the food products coming from the bottom basin 4, and for discharging said food products into a distributing or dispensing device 34, designed for leveling the products before discharging them.

The distributing device comprises, in particular, an inclined conveyor belt 35 designed for bringing the products inside a blowing tunnel 36, including a plurality of blowing devices and rotary brushes, affecting the products to level them and evenly distributing said products on the conveyor belt 35.

Both said top 3 and bottom 4 basins comprise a covering arrangement, respectively indicated by the reference number 22 and 23, with inspection doors, indicated respectively by 24 and 25, located along the extension of the basins.

The pasteurizing apparatus according to the present invention operates in the following manner.

The packaged products to be pasteurized are fed, through the conveyor belt 8, into the top basin 3 where, by contacting the hot water in said basin, are brought to a temperature suitable to provide the desired pasteurizing.

The products are driven along or through the extension of the top basin 3 by the separating walls 14 of the conveyor 19 to be transferred, through the inclined portion 15, from the top basin 3 to the bottom basin 4.

In said bottom basin 3 which, as stated, holds therein cold water, the food products, as they are fed through said basin, by swingably driving the panel 16 and under the effect of the water jets supplied by the nozzles 19, are progressively cooled.

The swinging panels 16, in particular, feed said food products with a so-called "pilgrim step by step arrangements".

By suitably changing the driving speed of the swinging panels 16, and the power of the water jets supplied by the nozzles 19 and the driving speed of the conveyor belt 20, it is possible to change the holding time during which the products are held in the bottom basin 4, thereby fitting said holding time to the different products being pasteurized, thereby preventing any bacteric growth from occurring.

Advantageously, according to the present invention, the bottom basin can be divided into sectors, by the movable walls 30, thereby changing the speed therewith the individual product lots are caused to be fed through said basin, and varying consequently the cooling time of said products.

Thus, it is possible, during a same pasteurizing process, to optimize the cooling time for each product.

The products are withdrawn from the bottom basin 4 and, after having passed through the distributing device, they are sent to following processing lines.

It has been found that the invention fully achieves the intended aim and objects.

In fact, the pasteurizing apparatus according to the present invention allows to change and control with a very high accuracy both the holding time during which the products are held to the pasteurizing temperature, and the cooling time of the pasteurized products.

The apparatus according to the present invention is specifically suitable to process comparatively high product amounts or flow-rates, up to 7000 kg/h.

Moreover, the capability of simultaneously processing different products, greatly increases the processing rate or yield of the apparatus.

The devices used in said apparatus, which comprise the top nozzles for spraying water on the products and pressurized water jets into said basins, allow to perform the pasteurizing and cooling up to the "core" of the product.

The orienting and inlet direction into the loading region can be easily changed depending on the contingent requirements.

The pasteurizing tracks, in particular, can have both a symmetrical and an asymmetrical arrangement.

It should be apparent that the number of the pasteurizing tracks can be changed from one to two or more tracks, while the shown embodiment illustrates two asymmetrical parallel tracks for each pasteurizing section and for each cooling section.

The apparatus according to the present invention is designed as a single operating block, though it is possible to include therein a plurality of pasteurizing track, thereby allowing to provide a number of different pasteurizing or processing lines.

In practicing the invention, the used materials, as well as the size of the parts constituting the apparatus, can be any, depending on requirements and the status of the art.

The invention claimed is:

1. An apparatus for continuously pasteurizing food products, said apparatus comprising: a supporting framework supporting a top basin and a bottom basin, both said top a bottom basins being substantially longitudinally horizontally extended and arranged one above the other, said top basin being supplied with hot pasteurizing water and said bottom basin being supplied with cold water; feeding means for feeding said food products through the top basin; transfer means for transferring said food products from the top basin to the bottom basin; further feeding means for feeding said food products through the bottom basin and product withdrawing means for withdrawing said food products from the bottom basin; wherein said apparatus further comprises first product holding time changing means for changing a product holding time in said top basin; and second holding time changing means for selectively changing a product holding time in said bottom basin, said top basin comprising top basin top manifolds adapted to spray hot water on said products in said top basin, said bottom basin comprising bottom basin top manifolds adapted to spray cold water on the products in said bottom basin, and wherein said feeding means for feeding said products through said bottom basin comprise a plurality of panels traversed by a plurality of elongated slots, arranged parallel to a bottom of the bottom basin, said panels being supported by swinging arms which can be controllably oscillated about horizontal axes, thereby driving said panels from bottom of the bottom basin upward and with a movement component parallel to a longitudinal extension of said bottom basin, thereby causing said products, arranged in said bottom basin, to be fed from the longitudinal end portion of said bottom basin arranged at a passage region of said products from said top basin to said bottom basin, in the direction of the opposite longitudinal end portion.

2. An apparatus, according to claim 1, wherein said cold water supplied to said bottom basin has a temperature from 0.5° C. to 10° C.

3. An apparatus, according to claim 1, wherein said feeding means for feeding said products into said top basin comprise a conveyor belt, or a plurality of conveyor belts, each said conveyor belt having an outlet thereof arranged a longitudinal end portion of said top basin.

4. An apparatus, according to claim 1, wherein said feeding means for feeding said products through said top basin comprise a chain conveyor, the chains thereof are entrained on horizontal axis pinions, supported by said supporting framework and which, at least in part, are motor driven thereby entraining said conveyor through a longitudinal extension of said top basin.

5. An apparatus, according to claim 3, wherein said conveyor is driven by a chain transmission coupling the shaft of a driven pinion of said conveyor to a driving motor.

6. An apparatus, according to claim 3, wherein said conveyor comprises spaced gate elements engaging with said food products be pasteurized supplied into said top basin.

7. An apparatus, according to claim 3, wherein said convey extends from a longitudinal end portion to the other longitudinal end portion of said top basin and, at said longitudinal end portion of said top basin opposite to the longitudinal end portion thereof served by said conveyor belt, extends for an inclined portion, through which said food products are transferred from said top basin to said bottom basin.

8. An apparatus, according to claim 1, therein said panels are swingably driven by swinging pistons each of which has an end portion fixed to said supporting framework and the other end portion thereof rigid with said panels.

9. An apparatus, according to claim 1, wherein said panels of said cooling bottom basin are divided into sectors for sorting different batches of products.

10. An apparatus, according to claim 9, wherein said sectors in said bottom basin are defined by a plurality of movable gate elements, each of which is driven by an actuator, thereby said gate elements can be raised to feed a selected product batch, and lowered to restrain another product batch to prevent the latter from being fed, and, vice versa, allowing a feeding of product batches not locked by said gate elements.

11. An apparatus, according to claim 1, wherein said feeding means for feeding said products through said bottom basin further comprise a plurality of water nozzles supplied with pressurized water and so oriented as to cause said products to be fed toward the longitudinal end portion of the bottom basin, arranged at the portion opposite to a product passage region from the top basin to the bottom basin.

12. An apparatus, according to claim 1, wherein said product withdrawing means for withdrawing said products from bottom basin comprise a conveyor belt, designed or receiving the products coming from the bottom basin, and discharging said products into a distributing device for leveling said products before the unloading thereof.

13. An apparatus, according to claim 12, wherein said distributing device comprises an inclined conveyor belt for bringing said products inside a blowing tunnel including a plurality of blowing devices and rotary brushes affecting the products to level said products and provide an even product distribution on said conveyor belt.

14. An apparatus, according to claim 1, wherein said top and bottom basins comprise a covering arrangement, including plurality of inspection doors, arranged along said basins.

15. An apparatus, according to claim 1, wherein said cooling bottom basin comprises separating walls, hydraulically driven feeding devices and a swinging bottom wall allowing to restrain said products being cooled in said cooling basin for a variable holding cooling time.

* * * * *